(12) United States Patent
Lamb et al.

(10) Patent No.: US 12,505,530 B2
(45) Date of Patent: Dec. 23, 2025

(54) PROCESSING OF REFUSE CONTAMINATION MEDIA CAPTURED BY CAMERAS

(71) Applicant: WasteVision LLC, Scottsdale, AZ (US)

(72) Inventors: Phil Lamb, Eagle, CO (US); Barry Sanders, Scottsdale, AZ (US); Anthony Peter Genovese, Southborough, MA (US)

(73) Assignee: WasteVision LLC, Scottsdale, AZ (US)

( * ) Notice: Subject to any disclaimer, the term of this patent is extended or adjusted under 35 U.S.C. 154(b) by 585 days.

(21) Appl. No.: 17/898,025

(22) Filed: Aug. 29, 2022

(65) Prior Publication Data

US 2024/0070844 A1  Feb. 29, 2024

(51) Int. Cl.
*G06T 7/00* (2017.01)
*G06V 20/52* (2022.01)
*G06V 30/224* (2022.01)

(52) U.S. Cl.
CPC ............ *G06T 7/0008* (2013.01); *G06V 20/52* (2022.01); *G06V 30/224* (2022.01); *G06T 2207/20081* (2013.01)

(58) Field of Classification Search
CPC ..... G06T 7/0008; G06V 20/52; G06V 30/334
See application file for complete search history.

(56) References Cited

U.S. PATENT DOCUMENTS

| | | | |
|---|---|---|---|
| 7,870,042 B2 | 1/2011 | Maruca et al. | |
| 2008/0237092 A1* | 10/2008 | Mallett | B07C 5/34 209/2 |
| 2019/0130560 A1* | 5/2019 | Horowitz | G06V 10/82 |
| 2021/0404861 A1* | 12/2021 | Curotto | G01G 19/08 |
| 2023/0136451 A1* | 5/2023 | Murad | G06N 3/047 209/546 |
| 2023/0381824 A1* | 11/2023 | Dadlani | B07C 5/10 |

* cited by examiner

*Primary Examiner* — Myron Wyche
(74) *Attorney, Agent, or Firm* — KPPB Law; Luis M. Ortiz; Kermit D. Lopez

(57) ABSTRACT

Methods and system for identifying individual materials from waste streams are disclosed. A request can be received from a requester to assess waste within a waste container. Media in the form at least one of still images or video streams can be accessed from at least one camera located in association with a waste container. The media can be transmitted to an artificial intelligence (AI) platform for processing to determine the class of individual materials contained in the media and provide identification with a confidence level. A data file containing processing results can be created. A response can be generated and transmitted to the requester that initiated the request. The response can include data that further includes all materials found by the AI platform as contained in the media with a confidence level for each and at least one of an identification of the requester, container identification, and container location.

40 Claims, 6 Drawing Sheets

PROCESSING OF REFUSE CONTAMINATION MEDIA CAPTURED BY CAMERAS

TECHNICAL FIELD

The present embodiments are generally related to the field of waste management, and more particularly tracking of refuse dumping and collection methods. More particularly, embodiments are related to the use of several camera angles and artificial intelligence to capture, process and assess refuse contamination and fill-levels in private and commercial refuse containers, refuse collection vehicle hoppers, and/or dumping stations. Embodiments are also related to anonymous processing of refuse contamination in media captured by cameras using artificial intelligence.

BACKGROUND

U.S. Pat. No. 7,870,042 B2 to Maruca et al, entitled "Systems and methods for identifying banned waste in a municipal solid waste environment", is hereby incorporated by reference for its teaching. Waste management companies provide residential, commercial, and municipal waste management and recycling services for communities and organizations. Customers can range, for example, from single residences to entire towns or companies. Municipalities may contract with a waste management service provider to handle their municipal solid waste (MSW). MSW includes garbage, refuse, and other discarded material that result from residential, commercial, industrial, and community activities.

Commonly, in conjunction with the collection of refuse, a waste management service places waste containers for use at multiple customer sites. Waste container types that are utilized by customers are diverse in the industry and include, for example, residential or commercial large-volume metal or plastic containers such as dumpsters, roll-off containers, and rolling lift (or tip) carts.

Often, residential or commercial customers put waste other than MSW into a waste container. Such waste can generally be termed "banned waste" that must be disposed of properly in order to comply with local, state and/or federal laws and regulations. One type of banned waste is referred to as hazardous waste. As used herein, hazardous waste is a waste with properties that make it dangerous or potentially harmful to human health or the environment. The universe of hazardous wastes is large and diverse. Hazardous wastes can be liquids, solids, contained gases, or sludges. They can be the by-products of manufacturing processes or simply discarded commercial products, like cleaning fluids or pesticides.

In regulatory terms, a Resource Conservation and Recovery Act (RCRA) hazardous waste is a waste that appears on one of the four hazardous wastes lists (F-list, K-list, P-list, or U-list), or exhibits at least one of four characteristics—ignitability, corrosivity, reactivity, or toxicity. Hazardous waste is regulated under the RCRA Subtitle C.

Another type of banned waste referred to as "special waste" can include items such as household hazardous waste, bulky wastes (refrigerators, pieces of furniture, etc.) tires, and used oil. State and local governments regulate both hazardous and special waste to ensure proper transport and disposal. Generally, only properly permitted and regulated companies are authorized to remove and dispose of these types of waste.

Both hazardous and special wastes are also regulated by local and state governments to ensure, for example, that proper transport and disposal procedures are followed. Often, customers co-mingle banned waste with standard MSW. Generally, only properly permitted and regulated companies are authorized to remove and dispose of these types of waste. If a waste carrier picks up these banned waste items, either knowingly or unwittingly, the waste carrier may be violating of one or more operating permits and is subject to various penalties such as monetary fines and/or suspension of one or more permits.

Waste contamination is generally the presence of any substance that is not supposed to be in a particular waste stream. For example, solid waste in a recycling waste stream or an organic waste stream is contamination. Likewise, recyclable materials would be a contaminant in a solid waste stream or an organic waste stream. Organic materials would be a contaminant in a solid waste stream or a recycling waste stream.

Currently, the process for identifying banned waste is manual and, therefore, prone to error. Manual waste audits (aka "lid flipping") typically only considers the first 30% or so of waste contained in a waste container. If collection vehicle personnel do not visually detect banned waste at the customer site, it can be inadvertently loaded onto the collection vehicle. The banned waste can then later be identified and removed at a transfer station or landfill. As a consequence, the waste company assumes the risk and is responsible for the proper disposal and associated costs for the banned waste. The waste company may not be able to pass these costs to the originating customer, because it is often impossible to identify the customer from which the banned waste was collected. However, banned waste sometimes also goes undetected throughout the entire collection, transport, and disposal process. This creates personnel safety implications, and the likelihood that the waste will end up in a landfill, which may eventually cause damage to the environment.

Therefore, a need exists for improvements to automatically identify banned waste during the MSW collection process. This would advantageously prevent banned waste from entering the MSW stream, and eliminate problems associated with subsequent disposal of this type of material. What is needed are methods and systems that can tie contamination events to a location, and which can do so in an automated fashion that provides necessary information to waste haulers and generators. Further, the identification of contamination and fill-levels should be narrowly focused to collect the necessary information on contaminants and fill-levels without distributing information which may compromise the privacy of the waste generator.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Throughout this disclosure, the term "refuse" also means "waste." The terms "container" or "waste container" should be broadly interpreted to include private and commercial waste containers located at a premises, a hopper associated with a waste collection vehicle, and a containment area wherein collected waste can be inspected.

It is, therefore, one aspect of the disclosed embodiments to provide systems and methods for preventing banned waste from entering the MSW stream, and eliminate problems associated with subsequent disposal of this type of material.

It is another aspect of the disclosed embodiments to provide methods and systems that can tie contamination events to a location, and which can do so in an automated manner that includes privacy features such as obscuring portions of the image that are not necessary for assessing or demonstrating contamination.

In accordance with the embodiment, it is a feature to provide methods and system for identifying individual materials from waste streams. In one aspect of the disclosed embodiments, a request can be received from a requester utilizing an onboard edge device ("OED") to assess waste contained in or obtained from a waste container. In another aspect of the disclosed embodiments, media in the form more than one of still images or video streams can be accessed from more than one camera in communication with the OED and located in association with at least one of a waste containers, a collection vehicle, or an inspection area.

In accordance with another aspect of the disclosed embodiments, the media can be transmitted to an artificial intelligence (AI) platform for processing to determine the class of individual materials contained in the media and provide identification with a confidence level.

In accordance with another aspect the AI platform can be located with the OED at a waste collection vehicle and/or remotely in at least one network accessible server.

In accordance with another aspect of the disclosed embodiments, a data file containing processing results can be created.

In accordance with another aspect of the disclosed embodiments, a response can be generated and transmitted to the requester that initiated the request.

In accordance with yet another aspect of the disclosed embodiments, the response can include data that further includes all materials found by the AI platform as contained in the media with a confidence level for each and at least one of an identification of the requester, waste container identification, and waste container location.

It is a feature of the embodiments that a secondary camera can be used to identify the end-customer/generator utilizing the bin serial number or other identifying marks (e.g., bar codes, QR codes, etc.), as well as identifying status such as overflowing bins, bin signage, features (e.g., locks or enclosures), bin size and/or damaged bins. Identification of the bin to its account holder and any results of contamination can be matched in the system for additional fees, auditing the equipment on location matches what is billed, education, or preventative maintenance.

It is another feature that optical character recognition be utilized to identify waste containers/bins. Municipalities or haulers can assign serial numbers to specific waste generators (i.e., residents). Currently, many municipalities have serial numbers marked on bins, but very few of them have tied those to the identification of waste generators (i.e., Residents). An AI engine together with optical characters recognition can assist with the identifications of waste containers, obtaining updated status assessments for waste containers, and notifying operators of waste container status. AI combined, OCR, access to historical/status data and user interface (UI) operator notifications can assist with type of organization, identification, and processing.

It is a feature of the embodiments that an anonymity feature can be provided that can enable privacy of a residents' waste through a process of pairing a unique identifier with an account as well as blurring out any background that is not pertinent to an item of interest i.e., contamination.

It is a feature of the embodiments that an automated trigger event can be provided which captures photos or video for processing through AI models could be initiated by any one of: the initiation of the trash vehicles lifting arm; vehicle approaching a container/serviceable asset utilizing sensors; the point at which the waste vehicles arm is at its highest point and thus the contents are being dumped into the vehicles receiving area (hopper); any point within the trajectory of the arms engagement with the container; the scanning of an RFID tag; recognition of identifying marks on a bin i.e., serial number, address, QR code etc.; precise GEO coordinates (e.g. GPS or GNSS); detection of conditions from another AI Model.

It is a feature of the embodiments that a trigger of event(s) could be adjusted to ensure ideal timing for photo/video initiation. For example, there may be a gap in time between the arm of the waste vehicle reaching the top/end of its trajectory and all of the contents of the bin/container being emptied into the hopper.

It is a feature of the embodiments that the AI engine can be used to determine the number of bags contained in each individual pickup. This feature can be used for pay as you throw programs which would charge a generators account based on the actual amount of waste they dispose of. Furthermore, it is a feature of the embodiments that the AI model can be trained to differentiate between bags that are issued by a municipality or county and bags that are not. Whereas the municipalities could take some form of action on accounts that do not follow the municipal, hauler or other rules. In addition, the system could estimate volumes of waste versus volumes of recyclables to determine diversion on a per account basis. Furthermore, the identification of items in waste streams would allow the municipality or hauler to charge fees based on items that are not disposed of in bags and are in the correct waste stream. For example, it may be acceptable to dispose of an appliance, but there is a fee associated with the disposal of the item identified.

It is another feature of the embodiments to allow for the sequencing of lifts. This feature would be used to distinguish the contents of bin A from the contents from the subsequent lift of bin B. By using the photo(s)/video of bin A as a reference the AI would exclude items from that bin in the AI analysis of bin B.

It is a feature of the embodiments to enable a determination of fill level utilizing at least two cameras in association with a waste container. For example, the hopper associated with a waste collection vehicle can include at least two cameras disposed at two different locations and angles with respect to the hopper. Images from the at least two cameras can be assessed by AI to determine the fill level within the waste container. As another example, at least two cameras can be located in association with a residential or commercial waste container associated with a premises, wherein images obtained from the at least two cameras can be assessed by AI to determine fill level.

It is a feature of the embodiments to allow for the use of sensor (non-photographic or video) within a bin to measure other parameters of waste such as heat, chemical, radiation, biowaste, toxicity, etc.

These and other features will become apparent after reading the detailed specification and claims.

DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 1, labeled as "prior art", depicts a block diagram of a banned waste detection system.

FIG. 2, labeled as "prior art", depicts an alternate exemplary block diagram of a banned waste detection system.

DETAILED DESCRIPTION

Figure 1:
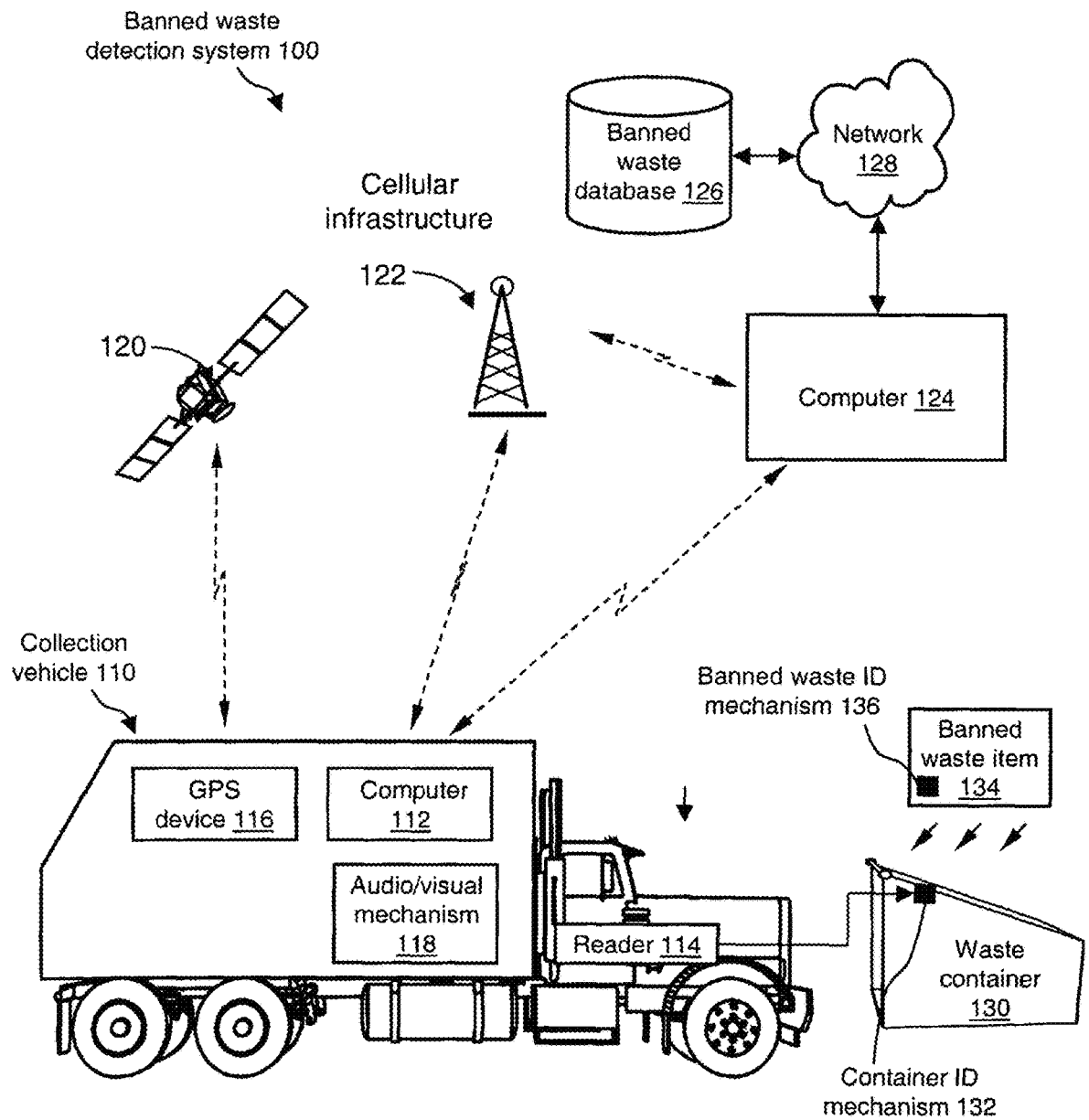

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part. In addition, identical reference numerals utilized herein with respect to the drawings can refer to identical or similar parts or components.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1, labeled as "prior art", is an exemplary block diagram of a banned waste detection system 100 as described in U.S. Pat. No. 7,870,042. Banned waste detection system 100 includes a collection vehicle 110 that further includes computer 112, reader 114, global positioning system (GPS) device 116, and audio/visual mechanism 118. Banned waste detection system 100 also includes GPS satellites 120, cellular infrastructure 122, computer 124, banned waste database 126, and network 128. Computer 124 and database 126 are connected via network 128. Additionally, banned waste detection system 100 includes waste container 130 that has a container identification (ID) mechanism 132 affixed thereon. Collection vehicle 110 can be, for example, one or more conventional waste hauling trucks that are used to collect refuse from a plurality of originator points. Originator points are, for example, commercial and industrial sites, residential curbsides, and/or community drop-off points. Computer 112 can be a standard laptop or desktop computer. Alternatively, computer 112 can be a mobile computing device that is integrated with collection vehicle 110. Such an integral computer 112 is supplied by Glacier Computing (New Milford, Conn.) or by Mobile Computing Corp. Inc. (Mississauga, Ontario). Computer 112 includes industry standard components (not shown) such as a standard user interface and display, a processor, and a storage device. Storage device can be a hard disk drive or other suitable non-volatile storage. Computer 112 also includes a clock device for providing timestamp data, and various standard interfaces such as universal serial bus (USB) for connecting to external devices. These devices are, for example, reader 114, GPS device 116, and audio/visual mechanism 118. Wireless communication is provided using, for example, a standard modem and cellular infrastructure 122, and/or an IEEE 802.11 wireless link. The wireless communication link allows computer 112 to communicate with computer 124 in various ways. Reader 114 is a commercially available RFID tag reader system, such as the TI RFID system, manufactured by Texas Instruments Incorporated (Dallas, Tex.). GPS device 116 is a standard global positioning system that supplies position data, such as digital latitude and longitude. The GEOTAB GPS system is a commercially available vehicle fleet and productivity management system, manufactured by GEOTAB (Burlington, Ontario, Canada), that can be utilized. Audio/visual mechanism 118 may be, for example, a buzzer, beeper, tone, and/or flashing light emitting diode (LED), that notifies collection vehicle 110 pickup personnel that reader 114 has detected banned waste item 134 via banned waste ID mechanism 136. Audio/visual mechanism 118 can be implemented on computer 112 using its visual display and/or the audio capabilities. GPS satellites 120 provide location data to GPS device 116 in a conventional manner. Cellular infrastructure 122 includes a plurality of cell towers and other cellular network interconnections (not shown), as is well known. Computer 124 can be, for example, any standard laptop or desktop computer, as is described in connection with FIG. 2.

Banned waste database 126 is a standard database, which is a collection of data related to identifying types of materials, also containing general guidelines concerning the handling thereof. An example of such a database is the CHEMLIST® database, available from CAS Databases (Columbus, Ohio). Waste container 130 can be any commonly used, large-volume receptacle, such as a dumpster, a roll-off container, or a 90-gallon toter that is used for residential curbside collection. Container ID mechanism 132 can be, for example, an RFID tag or bar code that allows waste container 130 to be uniquely identified. Container ID mechanism 132 can be scanned by reader 114, in order to extract the identification number thereon. When container ID mechanism 132 is read by reader 114, the RFID data can be transmitted to computer 112, and subsequently transmitted to computer 124. The reading of container ID mechanism 132 allows customer database 218 (FIG. 2) to determine the customer (or owner) associated with the banned waste item 134 and/or record the time that the banned waste item 134 was detected. Banned waste item 134 is a waste item that a waste management company is typically prohibited from collecting, or that may require special handling procedures. For example, banned waste 134 could be either hazardous and/or special waste that must be disposed of properly in order to comply with local, state, and federal laws and/or regulations. Banned waste ID mechanism 136 is, for example, a RFID tag, or other identifier such as a barcode, that provides identification data electronically to reader 114. Banned waste ID mechanism 136 may contain Resource Conservation and Recovery Act (RCRA) data that allows reader 114 to detect and determine that banned waste item 134 is hazardous. The RCRA data includes procedures that are to be used in treating, transporting, storing, and disposing of hazardous wastes. This information can be displayed by or in connection with computer 112. By use of banned waste ID mechanism 136, banned waste item 134 can be identified and separated, so as not to co-mingle with the MSW stream. If banned waste 134 is detected, there several different courses of actions that might be taken. For instance, if the banned waste 134 can be visually identified and removed, the customer may be notified. In addition, waste container 130 may be quarantined and an inspector may be summoned to inspect the waste container 130. The banned waste may also, if appropriate, be collected by collection vehicle 110.

Figure 2:
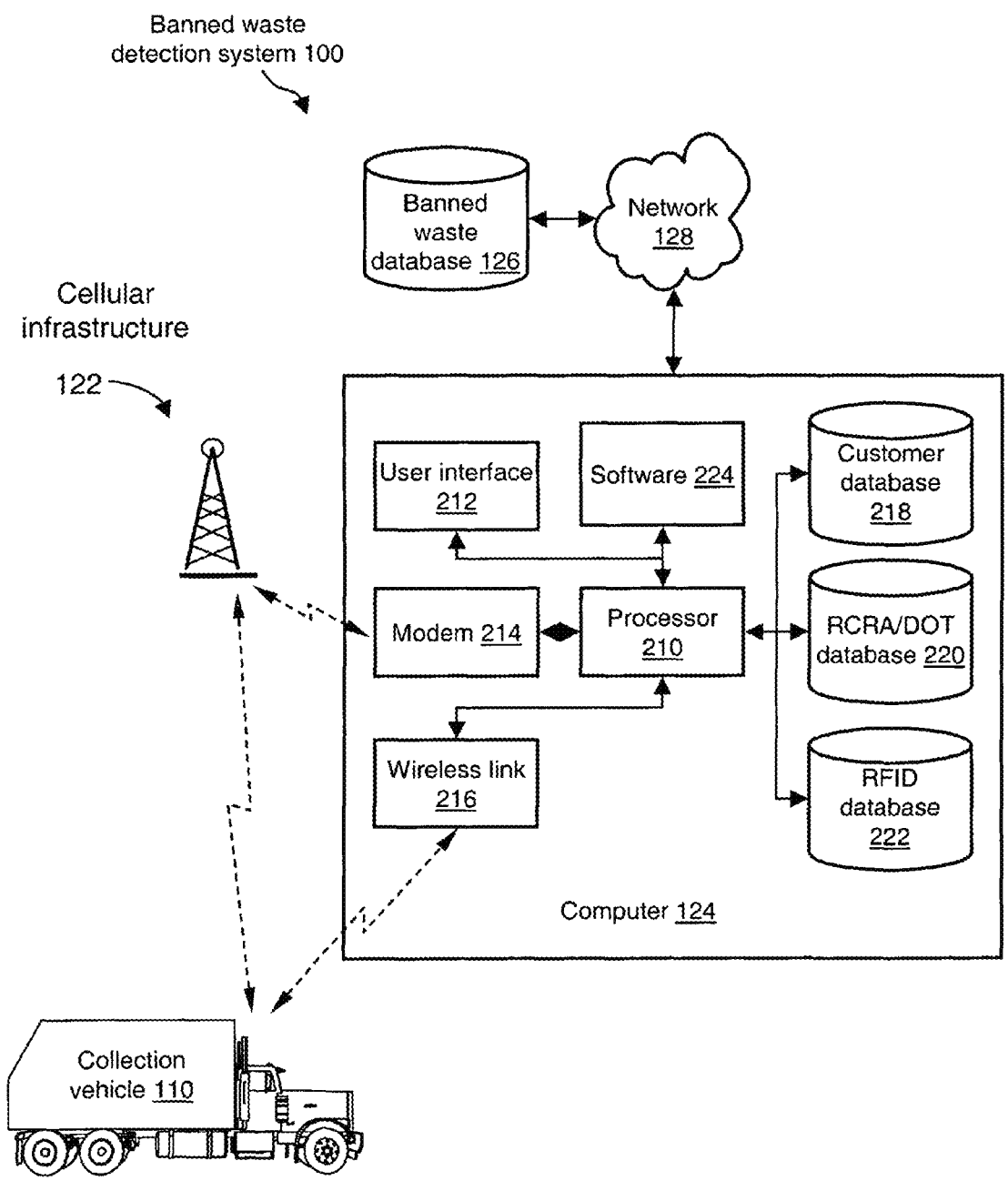

FIG. 2 is an exemplary block diagram of a banned waste detection system 100, in accordance with an embodiment of the present invention. Computer 124 includes standard components such as processor 210, user interface 212, modem 214, and wireless link 216. Computer 124 also contains, or utilizes one or more databases such as customer database 218, a Resource Conservation and Recovery Act/Department of Transportation (RCRA/DOT) database 220, and RFID database 222. Processor 210 can be a standard general purpose microprocessor, such as a Pentium or a PowerPC microprocessor device. User interface 212 can be a standard computer user interface for inputting and displaying data, such as a keyboard, mouse, or touch screen with accompanying menus and prompts. Modem 214 can be a standard wireless modem manufactured, for example, by CYNET Incorporated (Houston, Tex.). Wireless link 216 can be a standard interface that communicates using one or more wireless data communications links. Long range data links such as a Code Division Multiple Access (CDMA) 1×EV-DO or General Packet Radio Service (GPRS) link may be used. Short range wireless links such as IEEE 802.11 may also be used.

Customer database 218, RCRA/DOT database 220, and RFID database 222 are standard data repositories, or databases. The information stored in these repositories can be stored on a single medium and/or have their contents combined. Repositories 218, 220, 222 can be implemented in any manner that facilitates storage, access to, and/or retrieval of data. More particularly, customer database 218 may contain, for example, data fields and associated data pertaining to customer name, billing address, service address, frequency of service, account/payment/billing status, and service address GPS coordinates. RCRA/DOT database 220 contains a collection of data and information associated with the identification, collection, and management of hazardous and/or special waste, according to RCRA/DOT requirements, which may include federal, state, and/or local regulatory information that pertains to banned waste. For example, RCRA/DOT database 220 includes the following information: i) a solid waste that exhibits that characteristic of ignitability has the EPA Hazardous Waste Number of D001; ii) a solid waste that exhibits the characteristic of corrosivity has the EPA Hazardous Waste Number of D002; iii) a solid waste that exhibits the characteristic of reactivity has the EPA Hazardous Waste Number of D003; iv) a solid waste exhibits the characteristic of toxicity can have an EPA Hazardous Waste Number of D004 through D043. In addition to the D series above, the EPA also has an "F" Series, a "K" series, a "P" and a "U" series, as previously noted. RCRA/DOT database 220 also includes data such as safe and secure procedures that are to be used in treating, transporting, storing, and disposing of hazardous wastes.

RFID database 222 contains a record of items that may include banned waste items. For example, RFID database 222 contains a record of the specific RFID data associated with glass containers, plastic containers, aluminum containers, paper products, as well as banned waste items 134. As reader 114 scans mechanisms 136, computer 112 may keep a rolling tally (e.g., an inventory) of items 134 that are collected by vehicle 110. Customer database 218, RCRA/DOT database 220, and RFID database 222 can reside in a memory device (not shown), such as a hard disk drive of computer 124. In one or more alternate embodiments of the present invention, one or more of repositories 218, 220, 222 may also reside on collection vehicle 110, on a storage medium (not shown) used in connection with computer 112. The contents of customer database 218, RCRA/DOT database 220, and RFID database 222 may be organized and combined in any user-defined relational or non-relational database structure.

Software 224 analyzes data that is received from reader 114. For example, software 224 cross-references, as appropriate, the ID data received from mechanisms 132 and 136, via collection vehicle 110, to customer database 218, RCRA/DOT database 220 and/or RFID database 222. In doing so, software 224 determines the customer from mechanism 132 using customer database 218, and the type of each waste item 134 from mechanism 136 using RCRA/DOT database 220 and/or RFID database 222. Software 224 can identify any banned waste 134 that has been co-mingled in waste container 130, but only from a single perspective thereby impacting accuracy. In operation, collection vehicle 110 arrives at a pick-up location and engages waste container 130 and reads container ID mechanism 132.

The main limitation to prior art processes is in the image acquisition and assessment of media. Current systems are not acquiring enough actual images to have high confidence level. Additionally, customer may not be willing to provide media if they will not be able to obtain immediate results. These challenges can be overcome with the use of multiple camera angles being input into media files that can then be provided for remote assessment utilizing machine learning and artificial intelligence (AI) models.

What is needed is an Artificial Intelligence-based system that learns what contaminates to look for. In accordance with the present embodiments, large amounts of tagged images within a database can be provided to train an AI model to compare with materials in question during real time analysis. Ongoing learning of contaminates by an AI system can overcome obstacles in identifying waste.

Currently, cameras deployed in a limited fashion are used to take pictures or stream a live feed of the materials being dumped into a truck where they are evaluated by either the person in the truck or a person who manually analyzes the data to determine if contaminates are present. In this model there is no way to determine volume in a unified way. Alternatively, we believe AI technology can create automation where the media is processed remotely (i.e., in the cloud) without human intervention. A machine derived confidence level and volume of content can also be calculated using the system and methods disclosed herein.

Figure 3:
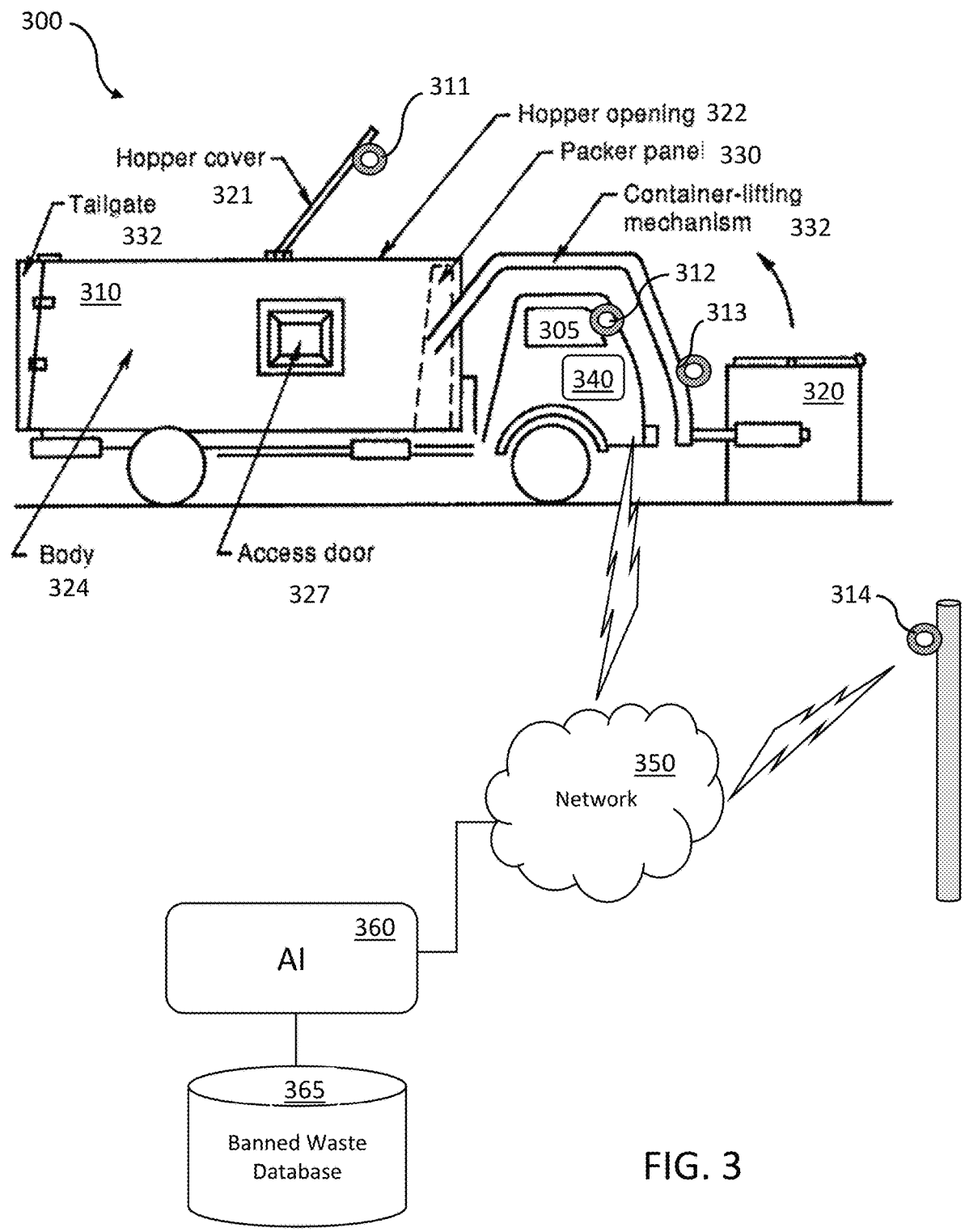
FIG. 3 illustrates a diagram for a system associated with a collection vehicle or waste container, in accordance with the embodiments.

Referring to FIG. 3, a system 300 that can be provided and used to identify individual materials from waste streams utilizing still images or video streams is illustrated. Images/Video Streams could come from a camera(s) 311, 312, 313 mounted to the collection vehicle 310, a camera 314 mounted external to a waste container 320 or in a waste container 320 and transmit media over a network 350 to an AI platform 360 for processing. An AI platform 360 including a banned waste database 365 that can determine individual material(s) contained in the image(s) and provide a confidence level. Once media is processed a response is generated by the AI platform 360 and passed to the entity that initiated the request (or other configured system). The response could include (but not limited to) any of an identifier of the request, all materials found by the AI platform 360 that is contained in the media with a confidence level for each, and other custom configured pass-through data (e.g., lat-long, RFID). The images combined with AI platform 360 processing could also be used to determine the volume of material in the media. This could be used for a variety of purposes such as billing, service optimization, etc. This is termed "Pay as you throw" which means the hauler bills based on the amount, volume, quantity, or weight of materials picked up. Also shown in FIG. 3 are features typically provided in association with a collection vehicle 310, including a hopper cover 321 wherein waste is dumped into a hopper opening 322, a tailgate 323 wherefrom waste is removed from the body 324 of the collection vehicle 310 wherein the waste has been compacted and stored, an access door 327 providing access to the hopper (325 shown in FIG. 4), a packer panel 330, that compresses waste within the hopper, and a container-lifting mechanism 332 that lifts the container 320 over the cab 305 and dumps waste into the hopper via the hopper opening 322. Data in the form of images that are acquired by cameras can undergo preliminary processing and storage in an onboard edge device 340 mounted in the collection vehicle 310. An onboard edge device 340 ("OED") can also be mounted in the waste collection vehicle 310 programmed to run an AI program thereby avoiding the inference costs of running data in real-time through cloud server infrastructure and incurring cellular network costs. This can assure that only pictures of contaminates can be sent to the AI Platform 360 over the data network 350 for further assessment/validation. If no evidence of contamination is found, a text verifying such can be sent to the remote AI platform 360.

Optical character recognition (OCR) be utilized as software in the OED 340 to identify waste containers/bins. Municipalities or haulers can assign serial numbers to specific waste generators (i.e., residents). Currently, many municipalities have serial numbers marked on waste containers (bins) 320, but very few of them have tied those to the identification of waste generators (i.e., residents, commercial operations). An AI engine 360 together with optical characters recognition can assist with the identification of waste containers, obtaining updated status assessments for waste containers from a such as banned waste database 365, and notifying operators of waste container status on a user interface 212 in the cab 305 (such as a touch sensitive screen). AI combined, OCR, access to historical/status data from a database and a user interface (UI) to provide operator notifications can assist with type of organization, identification, and processing.

Figure 4:
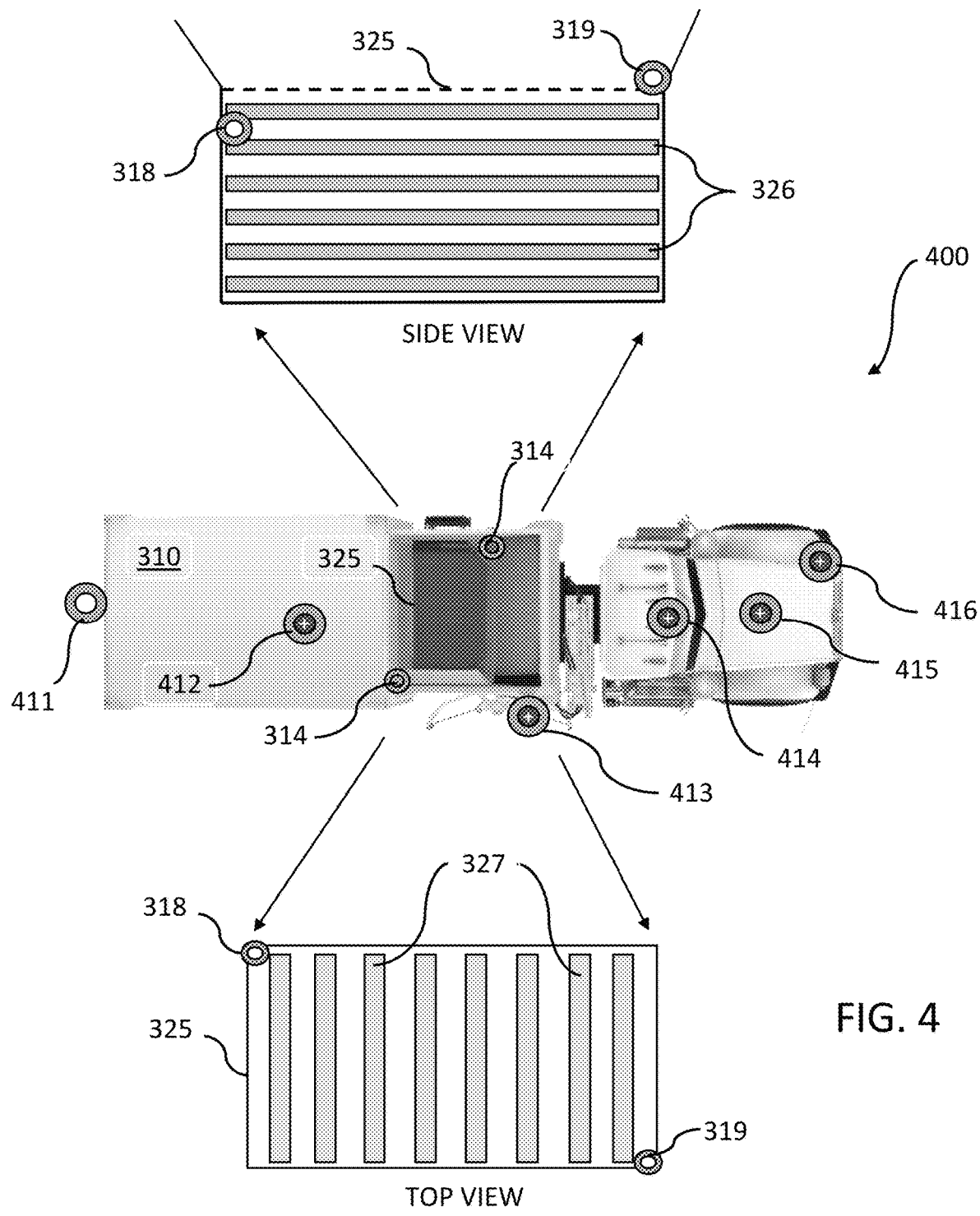
FIG. 4 illustrates side and top perspectives of a hopper/bin associated with a collection vehicle, in accordance with the embodiments.

Referring to FIG. 4, illustrated is a diagram 400 with side and top perspectives of a hopper/bin that can be associated with a collection vehicle 310 as described in FIG. 3, in accordance with the embodiments. The hopper 325 can include stripe markings 326 on its sides to indicate fill level for at least two cameras 318 and 319 located within, or in association with, the hopper 325. The hopper 325 can also include stripe markings 327 on its bottom to further indicate fill level to the at least two cameras 318/319. Also shown in FIG. 4 is the example inclusion of several other cameras 411-416 that can be located (mounted) throughout the collection vehicle 310 to provide additional perspectives of waste collection operations.

Figure 5:
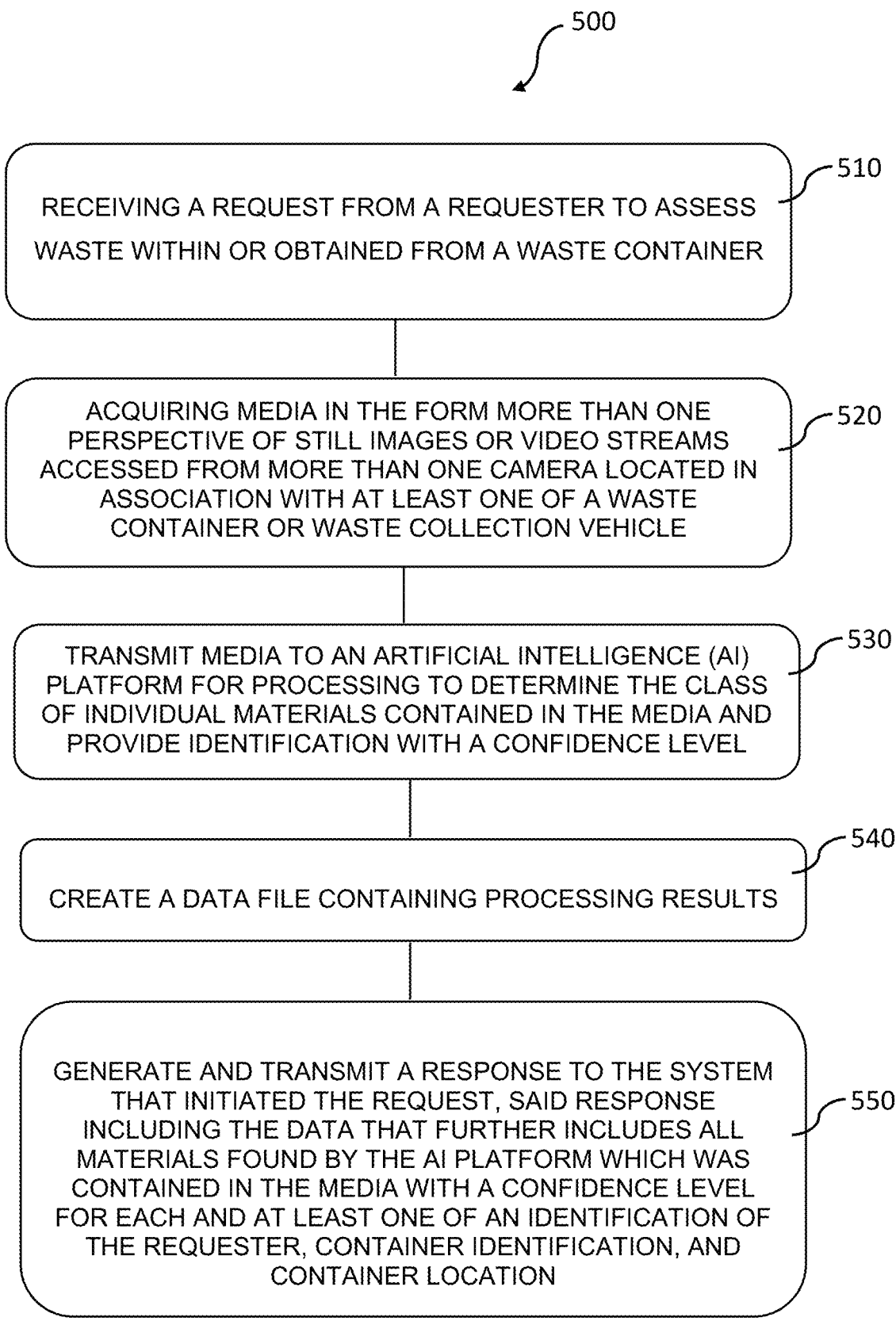
FIG. 5 illustrates a method for assessing waste within or obtained from a container, in accordance with the embodiments.

Referring to FIG. 5, a flow diagram 500 of method in accordance with the embodiments is illustrated. Referring to block 510, a request from a requester can be received to assess waste within or obtained from a waste container. Referring to block 520, media in the form of more than one perspective of still image or video streams can be acquired and assesses from more than one camera located in association with at least one of a waste container or waste collection vehicle. As shown in block 530, the media can be transmitted to an artificial intelligence (AI) platform for processing to determine the class of individual materials contained in the media and provide an identification with a confidence level. A data file containing processing results can be created, as shown in block 540. Then, as shown in block 550, a response can be generated and transmitted to the system that initiated the request. The response can include the data that further includes all materials found by the AI platform which was contained I the media with a confidence level for each and at least one of an identification of the requester, container identification, and container location.

The information from this invention can be used to improve reporting the quality of materials picked up at a granular level for recycling purposes and help to ensure landfills are not being burdened with non-environmentally friendly materials. The granularity would make it possible to identify the actual offenders of contamination, whereas previously it is not possible given the number of collections that occur in an individual route. This technology in some form does exist in Australia but in the United States of America it appears to be a manual process where the driver of the vehicle has a monitor in the cab and verifies contaminates by looking at the image on the monitor.

Waste operators including private or public hauling organizations would use this technology to have a better understanding of the behavior of its generators. Including but not limited to the volume generated, type of material in each individual stream, adherence to regulations of acceptable material in a stream. This would help operates with billing, fees, and possibly suspension of service. Waste Consultants, municipalities, large organizations with sustainability or Environmental, Social, and Governance (ESG) initiatives would also find benefits in this technology in a similar way. The use of an AI engine to automatically track the volume and character of waste disposal is highly valuable to an ESG program which is focused on measuring the amount of waste generation and the diversion rates of specific waste streams such as multiple types of recycling and organic waste.

The invention allows a still image or video media to be analyzed and processed via cloud-based AI technology in an automated consistent fashion removing an element of human interpretation or error. The benefits of this technology are as follows:

Saving time by reducing the amount of time by people for material analysis.

Reduce human error in identifying a contaminate and or remove the human element of not caring or following the process of flagging contaminates.

Lowering costs for processing media for contamination

Streamlining the process

Standardizing the results—No on-boarding, machine rules may be standardized to comply with certain laws, regulations, or policy goals. This enables consistent measurement across time, locations, and waste generators.

Keeps contaminates out of the landfills which in turn benefits the environment

California recently passed legislation that no longer permits organics/food waste to be discarded in solid waste or recycling bins. This technology could be used to enforce this new recycling program which in turn will decrease the amount methane and Co2 being released into the atmosphere. Further, there are several other states that have passed similar legislation including New Jersey, New York, Connecticut, Vermont, Rhode Island, and Washington.

By improving data collection, assessment and information flow, collection service providers and residents can be provided with the information they need, thereby making waste service more efficient. Using advanced technology— artificial intelligence, radio frequency identification (RFID) tags, GPS tracking, garbage truck cameras, and supplementary camera input—can provide interested parties with up to-date information, information that can be provided in an anonymous or private manner, and which can overall improve the experience around waste management services.

The presence of a contaminant in a receptacle can be documented via the AI technology wherein the requester/hauler can choose to educate or warn waste generators or levy a fine to the generator in accordance with applicable laws or ordinances. However, in addition to a fine a hauler might choose to stop service for waste generator, provide educational information to waste generator, and or warn the waste generator of the infraction.

Privacy will undoubtedly become an issue in the use of AI detection of generators/individuals waste items. We have the ability and will implement the blurring of all items other than those deemed contaminants. We believe this will be important to all parties as to limit exposure and liability of infringing on privacy rights.

Some municipalities manually audit waste and recyclables, from time to time, to determine the quantities of different disposed items i.e., the amount and/or percentage of waste that is bottles, cans, plastic bottles, cardboard etc. These audits could be automated using the AI platform described herein. The AI engine is able to collect data on the quantities of each item thereby eliminating the need for manual audits.

The EPA administers the Renewable Fuel Standard (RFS). As a part of RFS, Renewable Identification Numbers (RINs) are generated when a waste material is recycled to make a renewable fuel. For example, there are Used Cooking Oil (UCO) recyclers that take used oil from restaurants and others that use cooking oil. The haulers pick up the UCO and deliver it to aggregators or a processing plant that takes the UCO and transforms it into renewable fuel—each gallon collected enables them to generate a RIN. Likewise, haulers of organic waste collect organic waste and drop it off at "waste to energy" plants that convert the organic waste to biogas. This too enables generation of a RIN. Large oil companies (Shell, Exxon, etc.) are required by the government to purchase a certain number of RINs for every 100 gallons of gas sold—e.g., approximately 2 biodiesel RINs (cooking oil) for every 100 gallons of gasoline sold in the United States. To protect against fraud, CPA firms are being asked to do an attestation audit to confirm that RINs are legitimate. When the RINs are audited and the CPA firm attests to their legitimacy, the RINs become Q-RINs. As part of its regulatory oversight, the EPA requires that the CPA firms "trace" the recycled oil and organic waste, as applicable, back to its source. Employment of sensor technologies (e.g., cameras) and AI as described herein can enable the provision of granular details about the day/time, location, and amount of the waste picked up, and can assist in the tracking of RIN qualified waste back to its source.

The AI platform can be trained prior to assessment using cross model analysis wherein the AI platform is trained with at least one of example media which are manually tagged or synthetic data. 3D images and synthetic data examples of media that is contaminated or not contaminated can be utilized in training the IA platform. Training can also include utilization of optical character recognition via the cameras(s) to identify waste containers/bins as mentioned herein before.

The AI platform can be deployed via an onboard edge device 340 to run the AI program thereby avoiding the inference costs of running in the cloud and cellular network costs as only pictures of contaminates will be sent to the cloud. If no evidence of contamination is found text verifying such will be sent to the cloud. This can create the opportunity for at least two categories of processing, onboard (i.e., at the waste collection vehicle) and remote (i.e., in the cloud/remote server).

Figure 6:
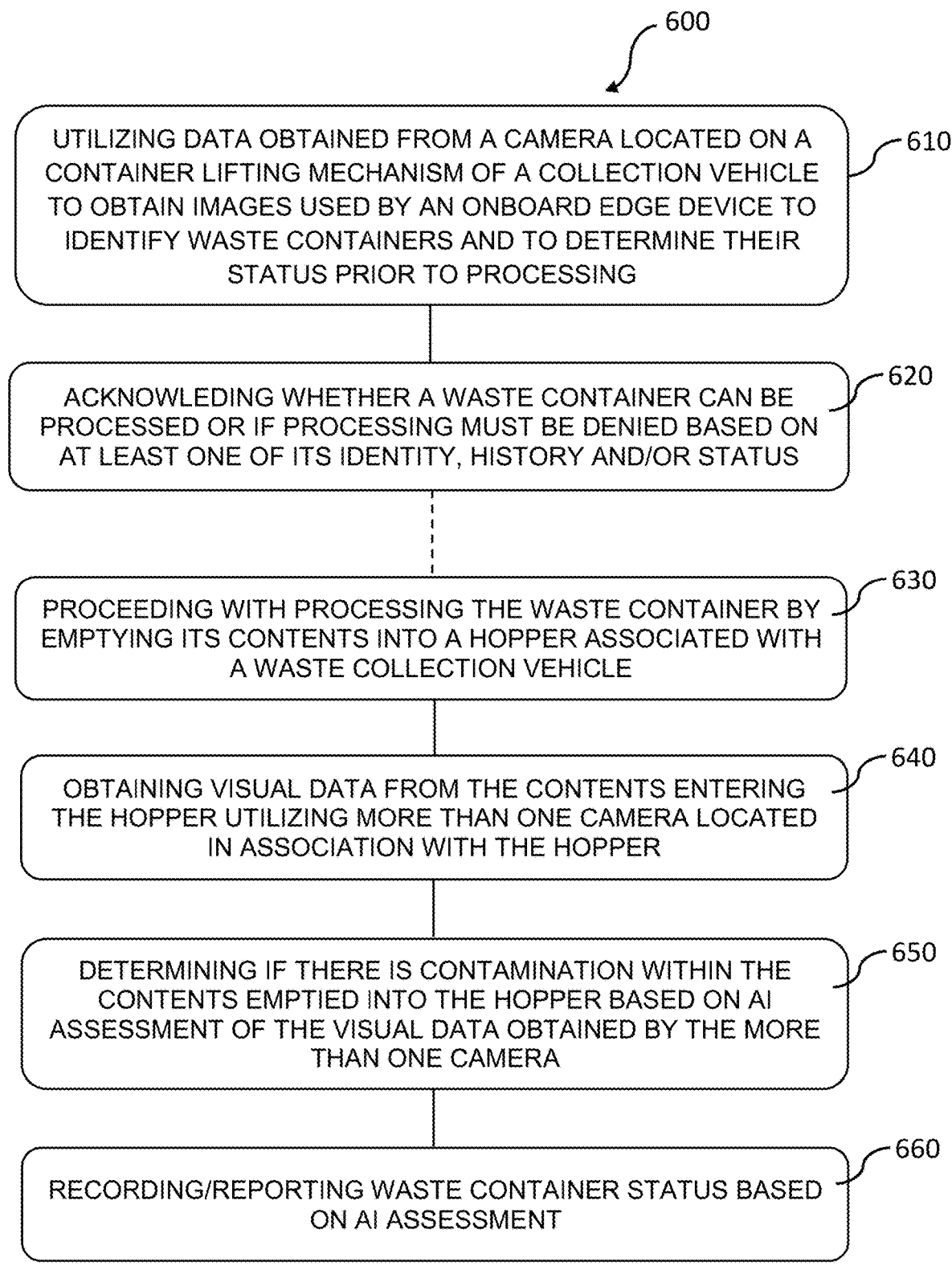
FIG. 6 illustrates another method for assessing waste within or obtained from a container, in accordance with the embodiments.

Referring to FIG. 6, illustrated is another flow diagram 600 of a method that can be carried out in accordance with the embodiments. Referring to block 610, data obtained from a camera located on a container lifting mechanism of a collection vehicle can be utilized by an onboard edge device (OED) to obtain images used identify waste containers and to determine their status prior to processing. Referring to block 620, It can be acknowledged based on the OED's assessment whether a waste container can be processed or if processing must be denied based on at least one of its identity, history and/or status. Identity can be based on its listing obtained from a database of banned or suspended waste containers. History can indicate prior violations/outstanding violation issues for a waste container based on its listing in data obtained from a database. Status can be based on database history or on a real-time condition as assessed by the camera, such as an overflowing condition. As shown in block 630, a collection vehicle can proceed with processing a waste container by emptying its contents into a hopper associated with the collection vehicle, if it passes the initial assessment outlined in steps 610-620. Visual data from the contents entering the hopper can be obtained utilizing more than one camera located in association with the hopper, as shown in block 640. As shown in block 650, it can be determined if there is contamination within the contents emptied into the hopper based on AI assessment of the visual data obtained by the more than one camera. It should be appreciated that the assessment can be conducted preliminarily by the OED in order to conserve on data communications resources. If the OED assessment determines that contamination of waste obtained from the waste container may exists, a more thorough AI assessment can occur remotely with images provided via data network communications to a remote AI platform. Then as shown in block 660, status of the waste container is recorded/reported based on results of the AI assessment. This status can be recorded in a data base (i.e., such as database 365). The data can also be reported to the operator (e.g., at the OED 340). The response can include the data that further includes all materials found by the AI platform which was contained in the media with a confidence level for each and at least one of an identification of the requester, container identification, and container location. The result of assessment can be utilized to, for example, initiate a "flag waste generator" condition and/or a "stop service" condition. Other conditions are possible.

The invention claimed is:

1. A method for identifying materials in waste streams, comprising:
receiving a request from a requester to assess waste already deposited in a waste container or a waste collection vehicle, the waste comprising multiple distinct materials;
acquiring media in a form of more than one perspective of still images or video streams accessed from more than one camera located in association with at least one of the waste container or the waste collection vehicle;
transmitting media to an artificial intelligence (AI) platform for processing to determine the class of some or all of individual materials contained in the media and provide identification;
creating a data file containing processing results; and
generating and transmit a response to the requester that initiated the request, said response including the data that further includes the some or all of the materials found by the AI platform which was contained in the media and at least one of: an identification of the requester, an identification of the waste container, and a location for the waste container.

2. The method of claim 1, wherein:
the location for the waste container is provided using GPS located with the waste container or the waste collection vehicle; and
identification of a generator associated with the waste container is determined based on identifying data obtained from the waste container.

3. The method of claim 1, wherein:
providing an identification of the waste container using at least one of: RFID or optical character recognition of an identification marking placed on the waste container; and
providing a trigger for initiating a capture of the media based on a detection of at least one of: the waste collection vehicle approaching the waste container using proximity sensing, a movement of the waste collection vehicle using proximity sensing, a movement of an arm of the waste collection vehicle using proximity sensing, lifting of the waste container by an arm of the waste vehicle, or a recognition of the identification marking on the waste container.

4. The method of claim 1, wherein the acquired images of the media combined with the AI platform is also used to determine the volume of material in the media.

5. The method of claim 1, wherein the media is assessed for data used for billing, service verification and service optimization.

6. The method of claim 5, wherein the billing is based on the amount of materials picked up as determined by an AI analysis of the media performed by the AI platform.

7. The method of claim 1, wherein information acquired from the media is used to improve reporting of the quantity and type of materials picked up from a waste container at a granular level for recycling purposes and help to ensure landfills are not being burdened with non-environmentally friendly materials.

8. The method of claim 7, wherein the granularity of the granular level enables an identification of offenders of waste container contamination.

9. The method of claim 1, wherein the at least one camera comprises at least one of: a camera mounted to the waste collection vehicle facing a waste container opening, a camera mounted to the waste collection vehicle truck acquiring contents in a hopper associated with the waste collection vehicle, a camera mounted at a location external to the waste container, or a camera mounted within the waste container.

10. The method of claim 1, wherein an analysis by the AI platform further includes at least one of: detecting bulk waste in designated areas, detecting container overflows, and detecting fill levels.

11. The method of claim 1, wherein output from the AI platform further includes at least one of: sending a notification/alert to a configured party; automating work orders to a configured party or integrated system, storing data for reporting purposes.

12. The method of claim 1, wherein the AI platform is trained prior to assessment using cross model analysis wherein the AI platform is trained with at least one of example media which are manually tagged or synthetic data.

13. The method of claim 1, further comprising using a sequence of multiple images acquired in prior waste collections of the waste container to determine what was in at least one of the waste containers or a hopper associated with the waste collection vehicle.

14. The method of claim 13, wherein the use of the sequence of multiple images acquired in prior waste collection is used to assure that contamination from previous collections is not counted towards subsequent collections.

15. A system for identifying individual materials from waste streams, comprising:
means for receiving a request from a requester to assess waste already deposited in a waste container or a waste collection vehicle, the waste comprising multiple distinct materials;
means for acquiring media in the form of at least one of still images or video streams accessed from more than one camera located in association with a waste container;
an onboard edge device disposed on the waste collection vehicle, the onboard edge device configured to receive and preliminarily process the acquired media;

means for transmitting the media to an automated processing system, wherein the media transmitted comprises at least a portion of the preliminary processed media selected by the onboard edge device;

the automated processing system configured for processing media received from requesters to determine a class of at least one individual material among the multiple distinct materials contained in the media and provide identification;

means to create a data file containing processing results; and means to generate and transmit a response to the system that initiated the request, said response including the data that further includes the at least one individual material among the multiple distinct materials found by the automated processing system which was contained in the media and at least one of an identification of the requester, a waste container identification, and a waste container location.

16. The system of claim 15, wherein:
the waste container location is provided using GPS associated with the waste container or waste collection vehicle; and
identification of a generator associated with the waste container is determined based on identifying data obtained from the waste container.

17. The system of claim 15, wherein:
the waste container identification is provided using at least one of; RFID or optical character recognition of an identification marking placed on the container or geolocation; and
a trigger initiates a capture of the media based on a detection of at least one of: the waste vehicle approaching the waste container using proximity sensing, a movement of the waste collection vehicle using proximity sensing, a movement of an arm of the waste collection vehicle using proximity sensing, lifting of the waste container by an arm of the waste vehicle, or a recognition of the identification marking on the waste container.

18. The system of claim 15, wherein:
the automated processing system comprises an artificial intelligence (AI) platform; and
the acquired images in the media combined with the AI platform is used to determine a volume of material in the media.

19. The system of claim 15, wherein media is assessed for data used for billing, service verification and service optimization.

20. The system of claim 19, wherein billing is based on the amount of materials picked up as determined by an AI analysis of the media performed by the AI platform.

21. The method of claim 15, wherein information acquired from the media is used to improve reporting of the quality of materials picked up from a container at a granular level for recycling purposes and help to ensure landfills are not being burdened with non-environmentally friendly materials.

22. The method of claim 21, wherein the granularity of the granular level enables an identification of offenders of waste container contamination.

23. The method of claim 15, wherein the at least one camera is at least one of: mounted to the waste collection vehicle facing a waste container opening, mounted to the waste collection vehicle acquiring contents in a hopper associated with the waste collection vehicle, a camera mounted at a location external to the waste container, or mounted within the waste container.

24. The method of claim 15, wherein the AI platform analysis further includes detecting bulk waste in designated areas, detecting container overflows, and detecting fill levels.

25. The method of claim 15, wherein output form the AI platform further includes at least one of: sending a notification/alert to a configured party; automating work orders to a configured party or integrated system, storing data for reporting purposes.

26. The method of claim 15, wherein the AI platform is trained prior to assessment using cross model analysis wherein the AI platform is trained with example media which are manually tagged.

27. The method of claim 15, further comprising using a sequence of multiple images acquired in prior waste collections of the container to determine what was in at least one of the waste containers or a hopper associated with the truck.

28. The method of claim 27, wherein the use of the sequence of multiple images acquired in prior waste collection is used to assure that contamination from previous collections is not counted towards subsequent collections.

29. A method for identifying waste containers and materials in waste streams, comprising:
utilizing data obtained from a camera located on a container lifting mechanism of a collection vehicle to obtain images used by an onboard edge device to identify waste containers and to determine their status prior to processing; and
acknowledging whether a waste container is processed or if processing must be denied based on at least one of its identity, history, and status, wherein the onboard edge device filters image data in real time to determine whether evidence of contamination is present and transmits only images indicating contamination to a remote Al platform for a further validation.

30. The method of claim 29, further comprising:
proceeding with processing the waste container by emptying its contents of the waste container into a hopper associated with a waste collection vehicle, when the waste container it passes an initial assessment;
obtaining visual data from the contents entering the hopper utilizing more than one camera located in association with the hopper;
determining when there is contamination within the contents emptied into the hopper based on an AI assessment of the visual data with the AI platform, wherein the visual data is obtained by the more than one camera; and
recording or reporting a status of the waste container status based on the AI assessment.

31. The method of claim 29, wherein a location for the waste container is provided using GPS located with the waste container or the waste collection vehicle.

32. The method of claim 29, wherein an identification of the waste container is can be provided by optical character recognition of an identification placed on the waste container.

33. The method of claim 30, wherein the visual data is used to determine the volume of material in the media emptied into the hopper.

34. The method of claim 30, wherein the media is assessed for billing, service verification and service optimization.

35. The method of claim 34, wherein the billing is based on the amount of materials picked up as determined by an AI analysis of the media performed by the AI platform.

36. The method of claim 30, wherein information acquired from the media is used to improve reporting of the quantity and type of materials picked up from a waste container at a granular level for recycling purposes and help to ensure landfills are not being burdened with non-environmentally friendly materials.

37. The method of claim 29, wherein the AI platform analysis further includes: detecting bulk waste in designated areas, detecting container overflows, and detecting fill levels.

38. The method of claim 30, wherein output from the AI platform further includes: sending a notification/alert to a configured party;
   automating work orders to a configured party or integrated system, storing data for reporting purposes.

39. The method of claim 30, wherein the AI platform is trained prior to assessment using cross model analysis wherein the AI platform is trained with at least one of: example media which are manually tagged or synthetic data.

40. The method of claim 30, further comprising using a sequence of multiple images acquired in prior waste collections of the waste container to determine what was in at least one of the waste containers or a hopper associated with the collection vehicle.

* * * * *